United States Patent
Lei et al.

(10) Patent No.: US 8,798,337 B2
(45) Date of Patent: Aug. 5, 2014

(54) SECTIONAL IMAGE RECOGNITION METHOD AND ZONAL RECOGNITION DEVICE THEREOF

(75) Inventors: Chih-Chi Lei, Taoyuan County (TW); Chun-Lang Hung, Taichung (TW)

(73) Assignee: Gingy Technology, Inc., Hsinchu (TW)

( * ) Notice: Subject to any disclaimer, the term of this patent is extended or adjusted under 35 U.S.C. 154(b) by 371 days.

(21) Appl. No.: 13/247,363

(22) Filed: Sep. 28, 2011

(65) Prior Publication Data

US 2012/0076370 A1    Mar. 29, 2012

(30) Foreign Application Priority Data

Sep. 29, 2010  (TW) .............................. 99133152 A

(51) Int. Cl.
G06K 9/00      (2006.01)
G06K 9/36      (2006.01)
G05B 19/00    (2006.01)

(52) U.S. Cl.
USPC ........... 382/125; 382/124; 382/286; 340/5.53

(58) Field of Classification Search
CPC . G06K 9/00; G06K 9/00013; G06K 9/00073; G06K 9/00067; G06K 9/0008; G06K 9/00093
USPC ......... 382/100, 115, 124, 125, 127, 126, 272, 382/254, 270, 266, 276, 286, 289, 181, 224, 382/228, 256, 293, 296, 190, 195, 205, 382/302; 340/5.53, 5.52; 356/71; 283/69, 283/68
See application file for complete search history.

(56) References Cited

U.S. PATENT DOCUMENTS

| | | | | |
|---|---|---|---|---|
| 5,109,428 A * | 4/1992 | Igaki et al. | ................... | 382/125 |
| 5,963,656 A * | 10/1999 | Bolle et al. | ................... | 382/124 |
| 5,974,163 A * | 10/1999 | Kamei | ......................... | 382/125 |
| 6,263,091 B1 * | 7/2001 | Jain et al. | ..................... | 382/125 |
| 6,289,112 B1 * | 9/2001 | Jain et al. | ..................... | 382/116 |
| 6,356,649 B2 * | 3/2002 | Harkless et al. | ............. | 382/115 |
| 7,072,496 B2 * | 7/2006 | Lo et al. | ........................ | 382/124 |
| 7,164,782 B2 * | 1/2007 | Baharav et al. | .............. | 382/124 |
| 7,233,685 B2 * | 6/2007 | Miyasaka et al. | ........... | 382/124 |
| 2011/0044513 A1 * | 2/2011 | McGonagle et al. | ........ | 382/124 |

* cited by examiner

*Primary Examiner* — Sheela Chawan
(74) *Attorney, Agent, or Firm* — Shimokaji & Associates P.C.

(57) ABSTRACT

A sectional image recognition method and a zonal recognition device are applied in a zonal fingerprint recognition device with small storage capacity. The method includes setting an image selection frame; capturing a corresponding fingerprint image block according to the image selection frame; executing a minutiae conversion program on the fingerprint image block to generate a minutiae block image corresponding to the fingerprint image block; repeating the foregoing steps until minutiae block image corresponding to all fingerprint image blocks are obtained; then executing an image stitching program on the corresponding minutiae block images according to acquisition sequence of the fingerprint image blocks for generating a minutiae image corresponding to the fingerprint image; executing a fingerprint recognition program on the minutiae image; and according to a recognition result acquired by the fingerprint recognition program, sending, by a zonal fingerprint recognition device, a corresponding response message to inform users of the recognition result.

16 Claims, 21 Drawing Sheets

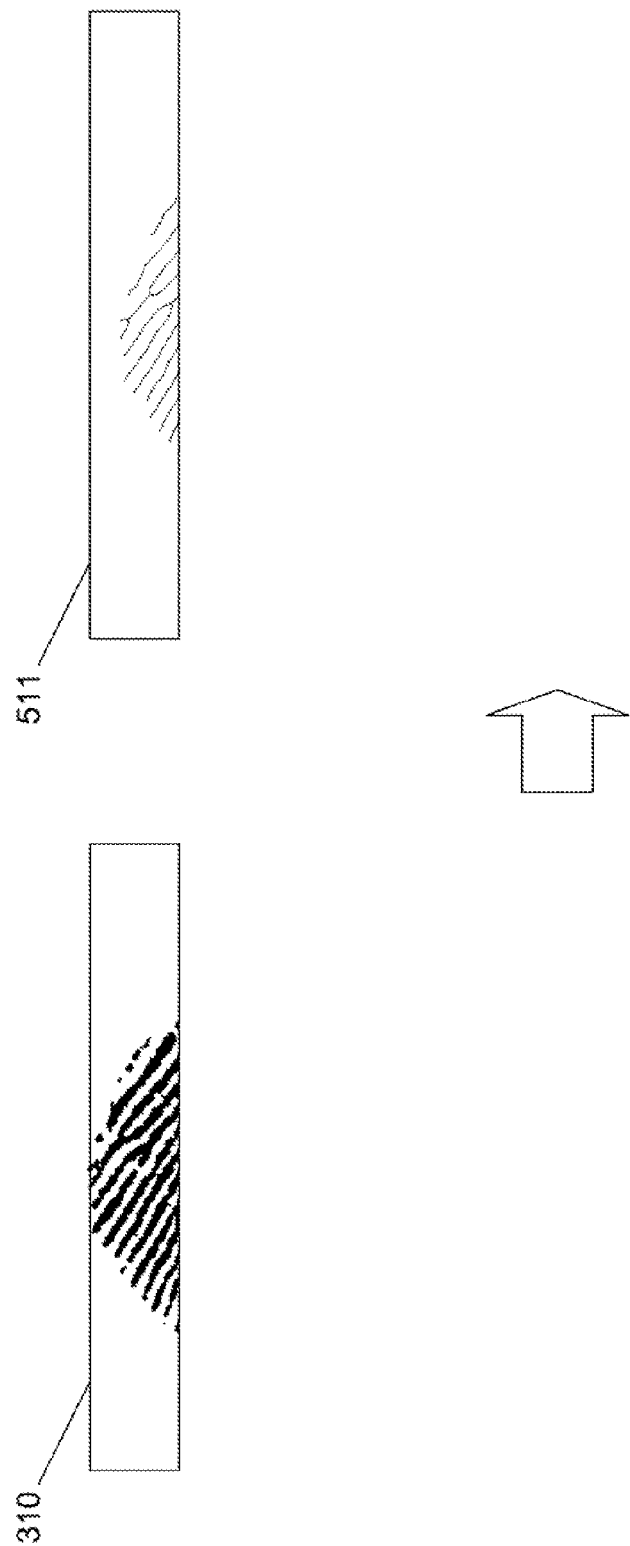

SECTIONAL IMAGE RECOGNITION METHOD AND ZONAL RECOGNITION DEVICE THEREOF

CROSS-REFERENCE TO RELATED APPLICATIONS

This non-provisional application claims priority under 35 U.S.C. §119(a) on Patent Application No(s). 099133152 filed in Taiwan, R.O.C. on Sep. 29, 2010, the entire contents of which are hereby incorporated by reference.

BACKGROUND

1. Technical Field

The present disclosure relates to an image recognition method and an electronic device thereof, and more particularly to a sectional image recognition method and a zonal recognition device thereof.

2. Related Art

With the development of science and technology, protection of personal data becomes more important. Currently, the most commonly used method for verifying the identity of a user is to input an account and a password by the user. Only when the input account and password are both correct, will an electronic device allow the user to access. In order to ensure complexity of a password, normally electronic devices limit a minimum length and types of characters of the password. When being input, a password is easy to be peeked by an interested person so risks still exist when the password is input. In addition, generally a user memorizes more than one password so troubles occur when the user forgets the set password.

Therefore, in order to solve the problem that the user has to memorize lots of the passwords, some manufacturers propose means of recognition using biological features, for example, iris recognition, voiceprint recognition, and fingerprint recognition. Fingerprint recognition requires less cost of equipment than recognition of other biological features, and each fingerprint is unique and is not identical with any other fingerprint so fingerprint recognition becomes another common means of identity recognition.

In a conventional fingerprint recognition manner, an image capture device is used to acquire a fingerprint image of a user, but different image capture devices vary in manners of acquiring a fingerprint image. In a reading manner using a linear sensor module 110, the user is required to slide a finger thereof across the linear sensor module 110 at a speed and with a pressing force, so as to enable the linear sensor module 110 to read a fingerprint image of the user in batches. Referring to FIG. 1A, FIG. 1A is a schematic view of fingerprint image capture by a linear sensor module in the prior art.

For a zonal fingerprint image capture device, the user is required to press a finger thereof on the zonal fingerprint image capture device. The zonal fingerprint image capture device reads a complete fingerprint image at a time, and performs recognition processes. Referring to FIG. 1B, FIG. 1B is a schematic view of fingerprint image capture by a zonal fingerprint image capture device of the prior art. A common zonal fingerprint image capture device is formed by a Complementary metal-oxide-semiconductor (CMOS) photosensitive device or a charge-coupled device (CCD).

All conventional image capture devices have different defects. Although the linear sensor module 110 does not need a large buffer space, displacement of the finger or an uneven force is easy to be incurred while the user presses the finger thereof, thereby acquiring an incomplete fingerprint image. Although the zonal fingerprint image capture device 120 can acquire a fingerprint image rapidly, the zonal fingerprint image capture device 120 requires a large buffer space to store the fingerprint image.

If the zonal fingerprint image capture device 120 is adopted, manufactures need to adopt an electronic device with a buffer space of large storage capacity, and in this way, production cost of a small-scale imbedded device is inevitably increased.

SUMMARY

Accordingly, the present disclosure is a sectional image recognition method, which is applied in a zonal fingerprint image capture device with small storage capacity.

In order to solve the aforementioned problems, a sectional image recognition method disclosed by the present disclosure comprises: setting an image selection frame of a fixed size; capturing a fingerprint image block of a size corresponding to the image selection frame; executing a minutiae conversion program on the fingerprint image block to generate a minutiae block image corresponding to the fingerprint image block; repeating the capture and conversion steps until minutiae block images of all fingerprint image blocks are obtained; executing an image stitching program on the corresponding minutiae block images according to an acquisition sequence of the fingerprint image blocks, so as to generate a minutiae image corresponding to the fingerprint image; executing a fingerprint recognition program on the minutiae image; and according to a recognition result acquired by the fingerprint recognition program, sending, by the zonal fingerprint recognition device, a corresponding response message.

In addition to the above embodiment, another sectional image recognition method is provided by the present disclosure, which comprises: Step a: setting an image selection frame; Step b: capturing a fingerprint image block of a size corresponding to the image selection frame; Step c: executing a normalization program on the fingerprint image block, so as to acquire a mean value and variance values of the fingerprint image block; Step d: repeating Steps b to c until a mean value and variance values of each of the fingerprint image blocks are recorded; Step e: acquiring the fingerprint image block in a new round, and calculating a directional parameter and a mask range of the fingerprint image block; Step f: repeating Step e until a directional parameter and a mask range of each of the fingerprint image blocks are recorded; Step g: acquiring the fingerprint image block in a new round, and performing normalization processing on the acquired fingerprint image block and the corresponding mean value and variance values, so as to generate a first minutiae block image; Step h: according to the directional parameter and the mask range of a corresponding position, generating a second minutiae block image from the first minutiae block image; Step i: executing a binarization program on the second minutiae block image, so as to generate a third minutiae block image; Step j: repeating Steps g to i until all third minutiae block images are acquired; Step k: executing an image stitching program according to an acquisition sequence of the third minutiae block images, so as to generate a minutiae image corresponding to the third minutiae block images; Step l: executing a fingerprint recognition program on the minutiae image; and Step m: according to a recognition result acquired by the fingerprint recognition program, sending, by the zonal fingerprint recognition device, a corresponding response message.

In order to implement the operation of the present disclosure, the present disclosure also provides a sectional zonal image recognition device, which comprises an image capture unit, a storage unit, and a processing unit. The image capture unit is used to capture fingerprint image blocks. The storage unit is used to store the fingerprint image blocks, a minutiae conversion program, an image stitching program, and a fingerprint recognition program. The processing unit is electrically connected to the image capture unit and the storage unit. The processing unit acquires the fingerprint image blocks in sequence according to the image selection frame and through the image capture unit. The processing unit executes the minutiae conversion program on the fingerprint image block to generate the minutiae block image corresponding to the fingerprint image block. The processing unit acquires the minutiae image from the minutiae block images through the image stitching program. The processing unit executes the fingerprint recognition program according to the minutiae image and returns the corresponding response message.

In the sectional image recognition method and the device thereof according to the present disclosure, the image selection frame is preset, and the fingerprint image blocks in different positions are captured in sequence. The recognition device acquires the corresponding minutiae block image from the fingerprint image block. Finally, the recognition device stitches all of the minutiae block images, so as to generate the complete minutiae image. In this way, the recognition device may also achieve the objective of fingerprint recognition without the need of being disposed with a storage unit of large storage capacity. Furthermore, the user is not required to slide a finger thereof, so that the problem of image dislocation caused by an uneven force applied during pressing is not incurred.

BRIEF DESCRIPTION OF THE DRAWINGS

The present disclosure will become more fully understood from the detailed description given herein below for illustration only, and thus are not limitative of the present disclosure, and wherein:

FIG. 7C is a schematic view of a minutiae block image of fingerprint line segments according to the present disclosure;

DETAILED DESCRIPTION

Figure 1A:
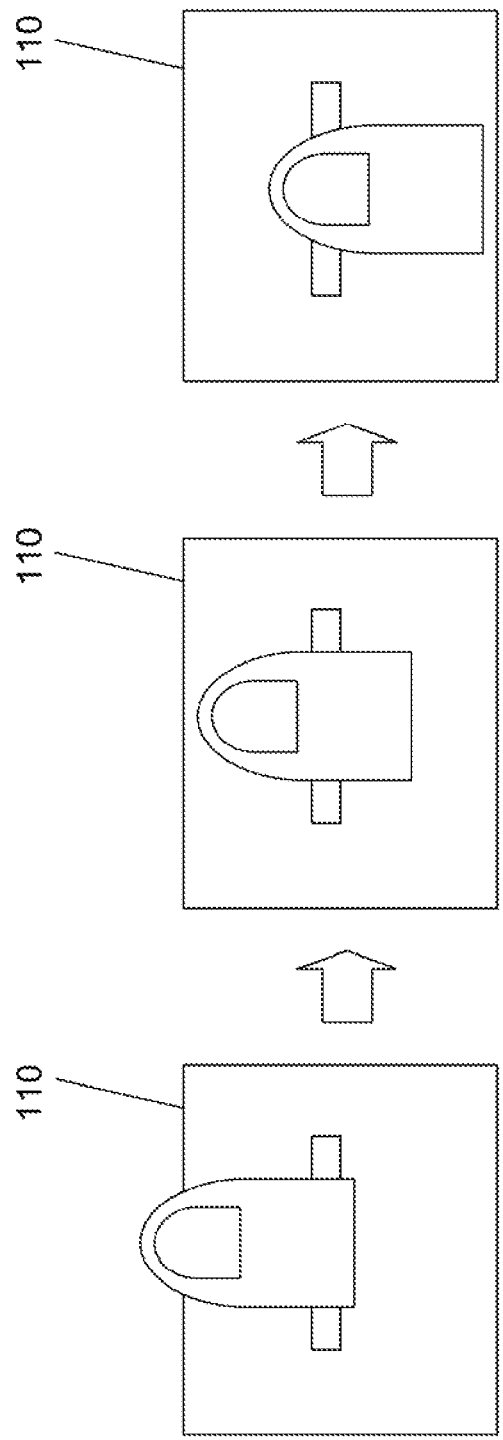
FIG. 1A is a schematic view of fingerprint image capture by a linear sensor module in the prior art.
Figure 1B:
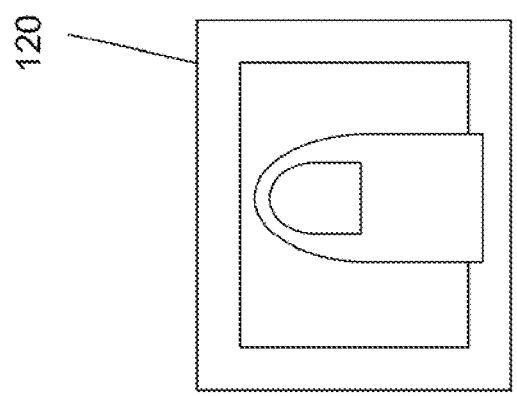
FIG. 1B is a schematic view of fingerprint image capture by a zonal fingerprint image capture device of the prior art.
Figure 2:
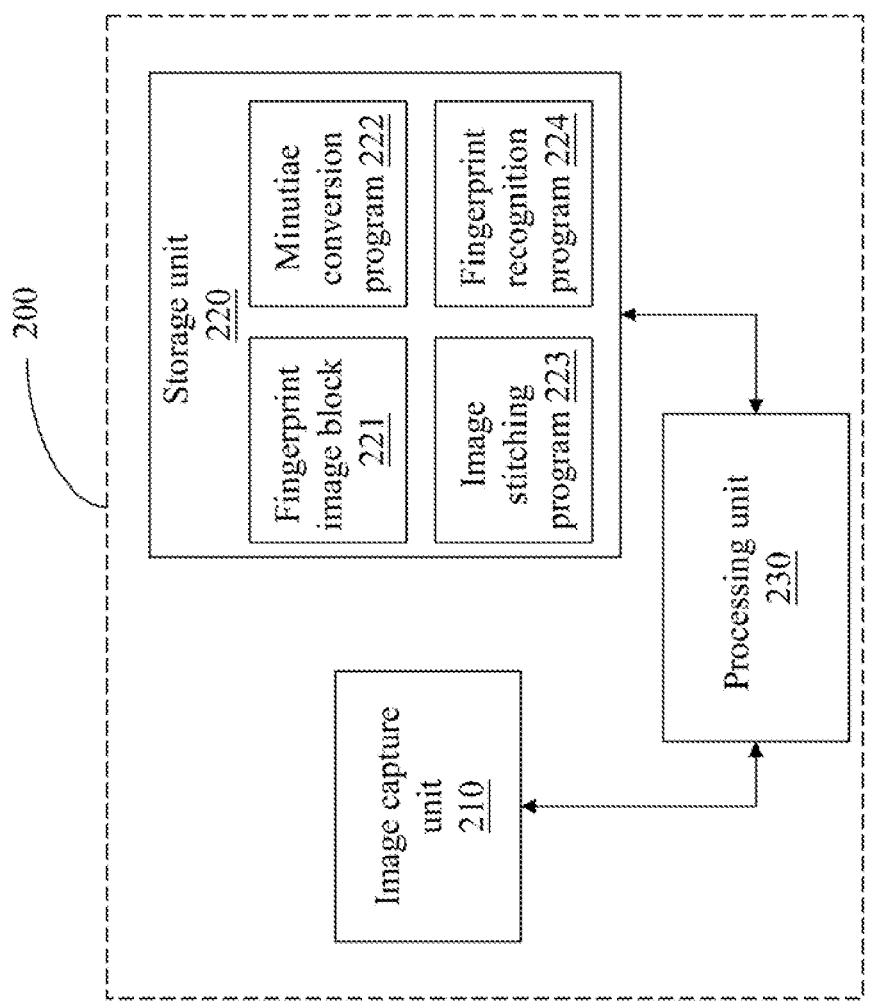
FIG. 2 is block diagram of a fingerprint recognition device of an embodiment.

FIG. 2 is a block diagram of a fingerprint recognition device of an embodiment. A zonal fingerprint recognition device (called fingerprint recognition device 200 below for short) comprises an image capture unit 210, a storage unit 220, and a processing unit 230. The image capture unit 210 is used to capture a fingerprint image block 221. The storage unit 220 is used to store the fingerprint image block 221, a minutiae conversion program 222, an image stitching program 223, and a fingerprint recognition program 224. The storage unit 220 may be any one or a combination of a random access memory (RAM), a flash memory, and a read only memory (ROM).

For example, the minutiae conversion program 222, the image stitching program 223, and the fingerprint recognition program 224 are built-in programs, which may be stored in a flash memory or a ROM. Besides, a fingerprint image obtained by the fingerprint recognition device 200 may be temporarily stored in a RAM. In some embodiments, the image and the programs may be stored in the flash memory.

The processing unit 230 is electrically connected to the image capture unit 210 and the storage unit 220. The image capture unit 210 is used to capture the fingerprint image block 221. For the fingerprint recognition device 200 of the present disclosure, a user is only required to press a finger thereof still on a press plate and hold stationary, without the need of moving the finger to slide the finger on the press plate, so as to enable the image capture unit 210 to capture a fingerprint image pressed on the press plate. The storage unit 220 is used to store the fingerprint image block 221, the minutiae conversion program 222, the image stitching program 223, and the fingerprint recognition program 224.

Figure 3:
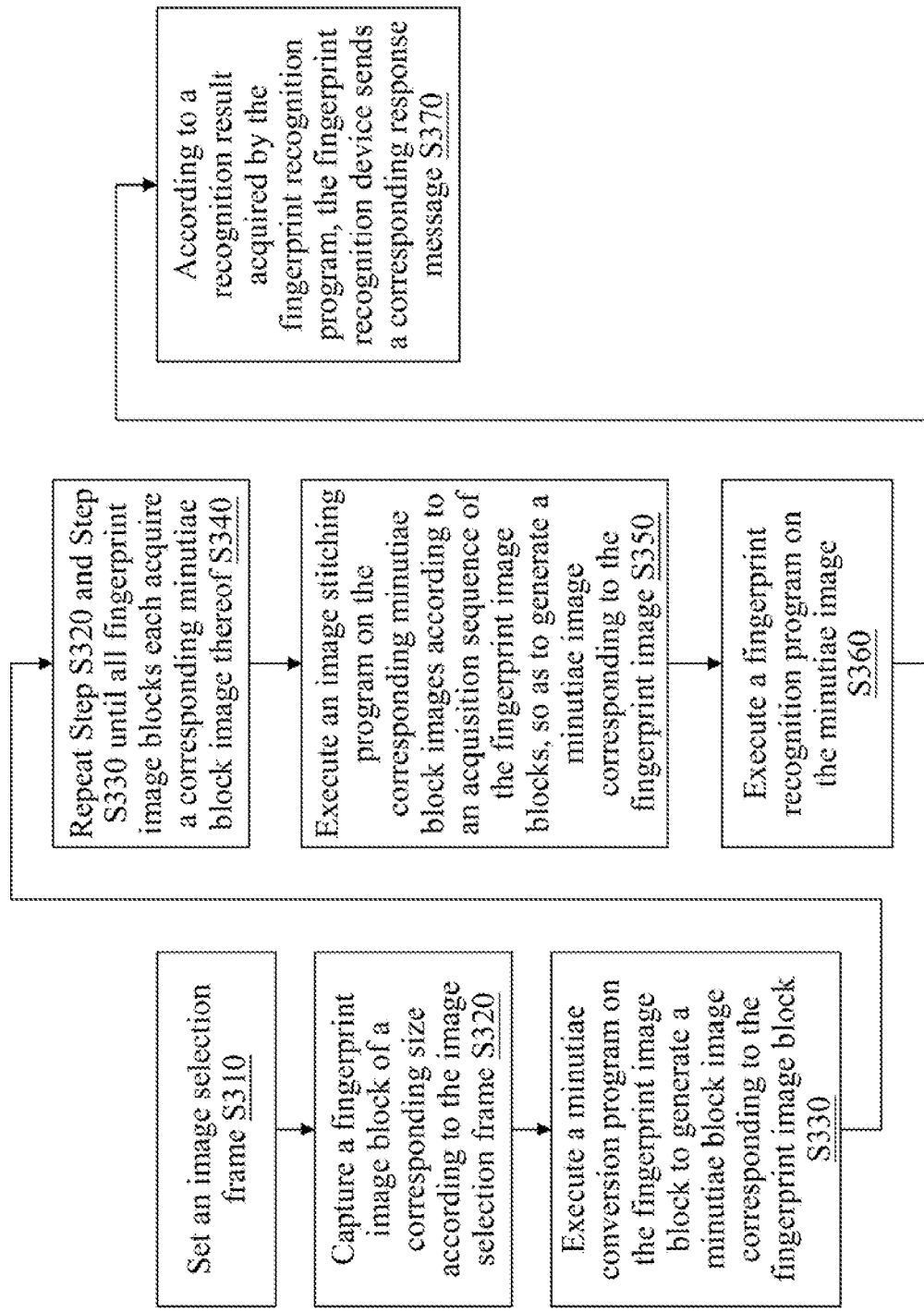
FIG. 3 is a schematic flow chart of an overall operation according to the present disclosure.

The processing unit 230 is electrically connected to the image capture unit 210 and the storage unit 220. The processing unit 230 performs the following recognition process on the captured fingerprint image block 221. Referring to FIG. 3, FIG. 3 is steps of the recognition process according to an embodiment.

In Step S310, image selection frames are set.

In Step S320, a fingerprint image block of a size corresponding to the image selection frame is captured.

In Step S330, the minutiae conversion program is executed on the fingerprint image block to generate a minutiae block image corresponding to the fingerprint image block.

In Step S340, Step S320 and Step S330 are repeated until that the minutiae block images corresponding to all fingerprint image blocks are generated.

In Step S350, the image stitching program is executed on the minutiae block images according to an acquisition sequence of the fingerprint image blocks, so as to generate a minutiae image corresponding to a fingerprint image.

In Step S360, the fingerprint recognition program is executed on the minutiae image.

In Step S370, according to a recognition result acquired by the fingerprint recognition program, the fingerprint recognition device sends a corresponding response message.

Figure 4A:
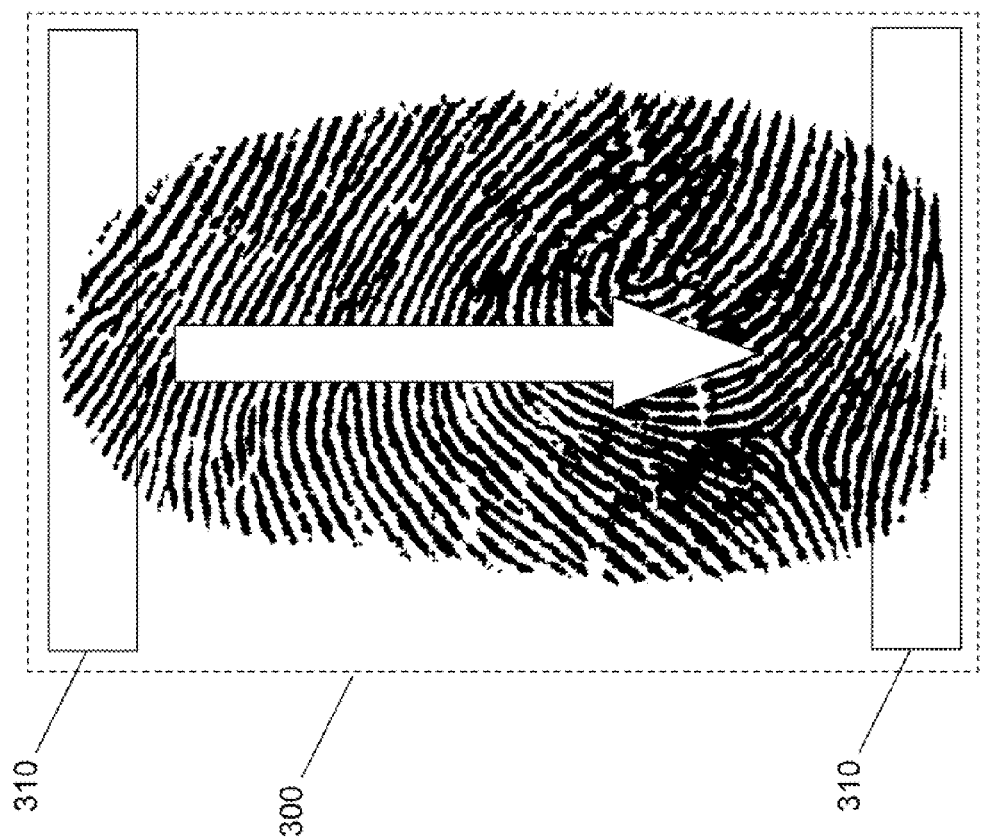
FIG. 4A is a schematic view of transverse selection of an image selection frame according to the present disclosure.
Figure 4B:
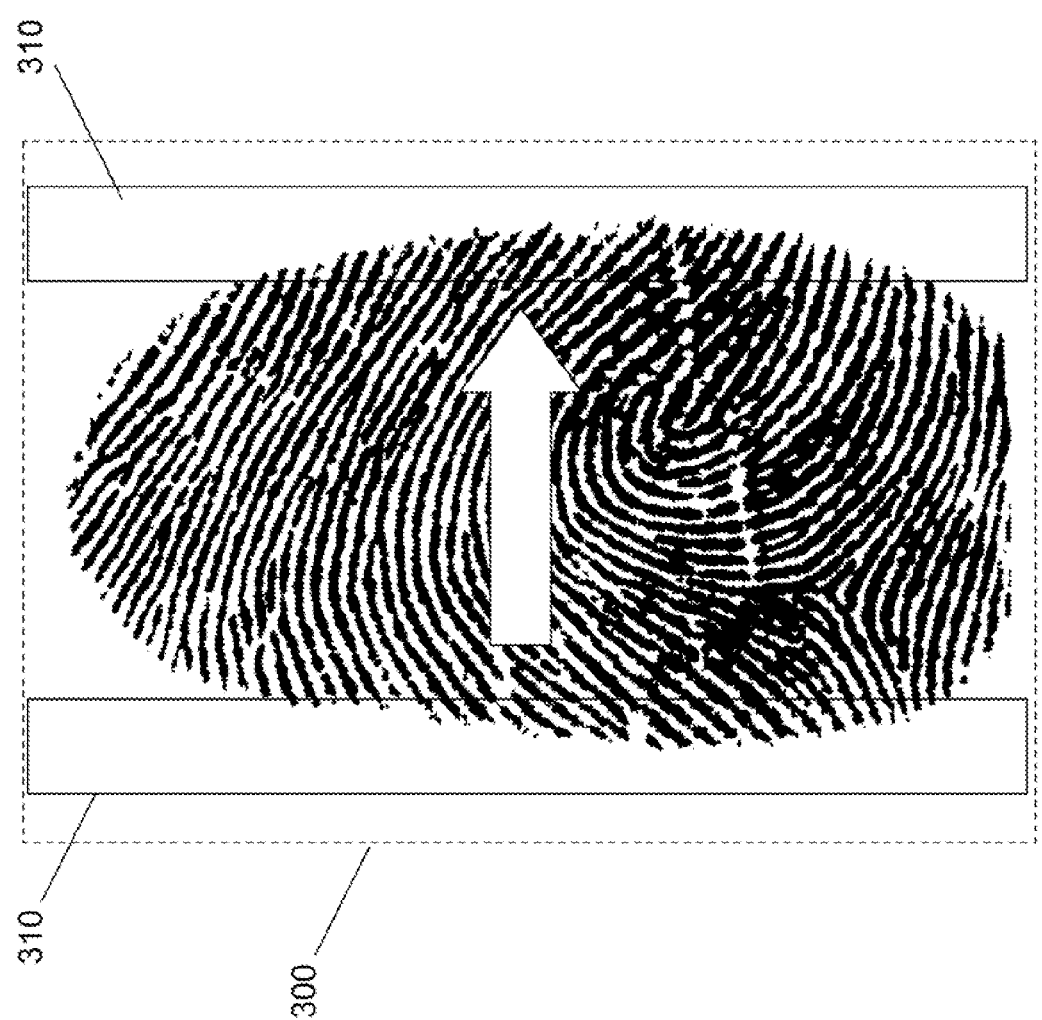
FIG. 4B is a schematic view of longitudinal selection of an image selection frame according to the present disclosure.

The fingerprint recognition device 200 of the present disclosure is applicable to the storage unit 220 with small storage capacity. In Step S310, the size of the image selection frame 310, which is set by the fingerprint recognition device 200, is smaller than that of a complete fingerprint image 300. For example, the image selection frames 310 may be selected, as shown in FIG. 4A, one by one in sequence from top to bottom in a longitudinal axis direction or, as shown in FIG. 4B, one by one in sequence from left to right in a transverse axis direction.

Figure 4C:
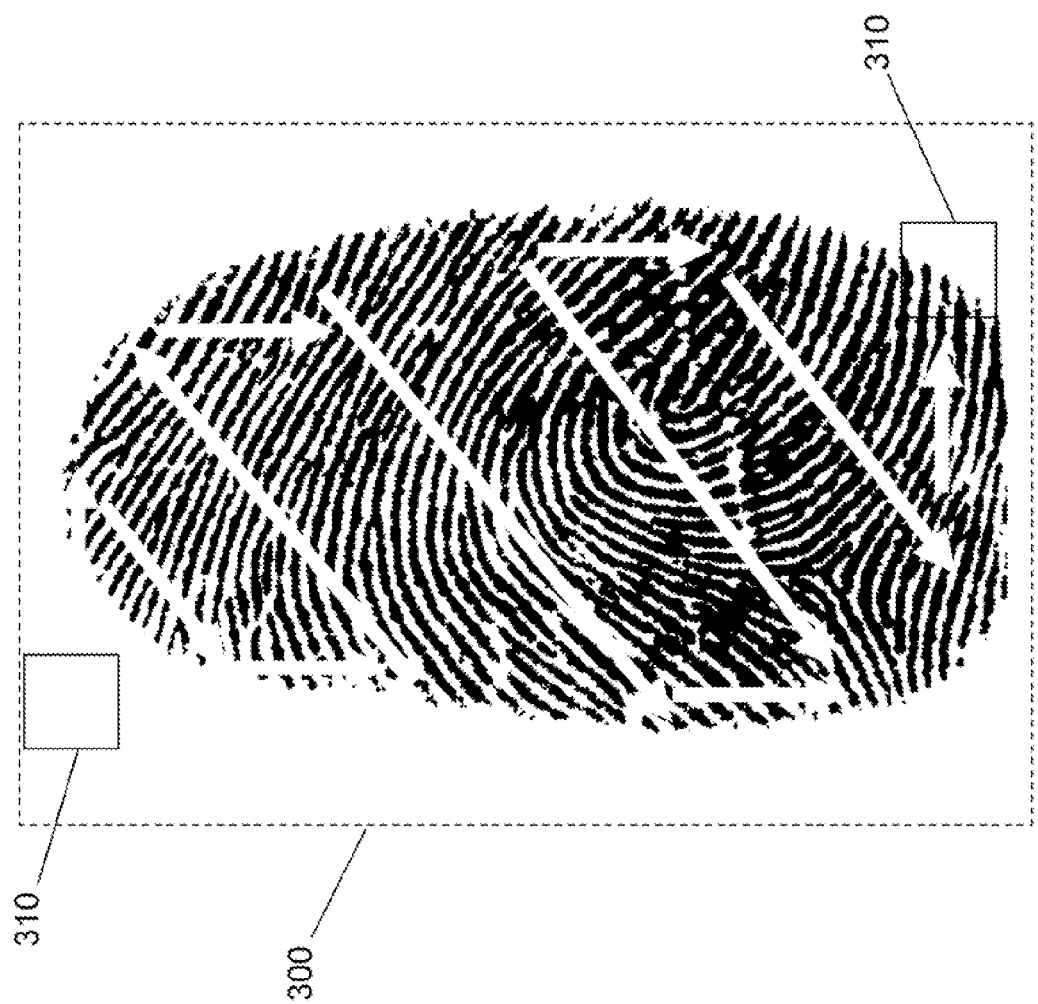
FIG. 4C is a schematic view of zigzag selection of an image selection frame according to the present disclosure.

Besides, the image selection frame 310 may also be selected one by one in a zigzag selection manner. Referring to FIG. 4C, the image selection frame 310 is at the top-left of FIG. 4C, and white arrows are movement paths of the image selection frame 310.

Then, the processing unit 230 drives the image capture unit 210 according to the size of the image selection frame 310 to shoot different parts of the fingerprint image 300 in sequence, and the selected partial fingerprint images are defined herein as the fingerprint image blocks 221. A shooting sequence of the fingerprint image blocks 221 may be, but is not limited to, shooting in the longitudinal axis direction, in the transverse axis direction, or in the zigzag selection manner. The image capture unit 210 shoots two adjacent fingerprint image blocks 221 in a non-overlapping manner or a partly-overlapping manner.

After the image capture unit 210 acquires each fingerprint image block 221, the minutiae conversion program 222 is executed on the fingerprint image block 221, so as to generate a minutiae block image corresponding to the fingerprint image block 221. The minutiae conversion program 222 may be, but is not limited to, a binarization program, a minutiae point conversion program or a combination of the binarization program and the minutiae point conversion program. Descriptions of those minutiae conversion programs 222 are provided below.

The minutiae block image generated after the fingerprint image block 221 is processed by the minutiae conversion program 222 has a data amount smaller than that of the fingerprint image block 221. Each time the processing unit 230 generates one minutiae block image, the processing unit 230 delete the fingerprint image block 221 corresponding to such minutiae block image. Therefore, there is no need for the storage unit 220 to provide a lot of space to store all the shot fingerprint image blocks 221. The processing unit 230 repeats the steps of capturing the fingerprint image block 221 and executing the minutiae conversion program 222, until shooting of the entire fingerprint image 300 is completed.

Figure 5:
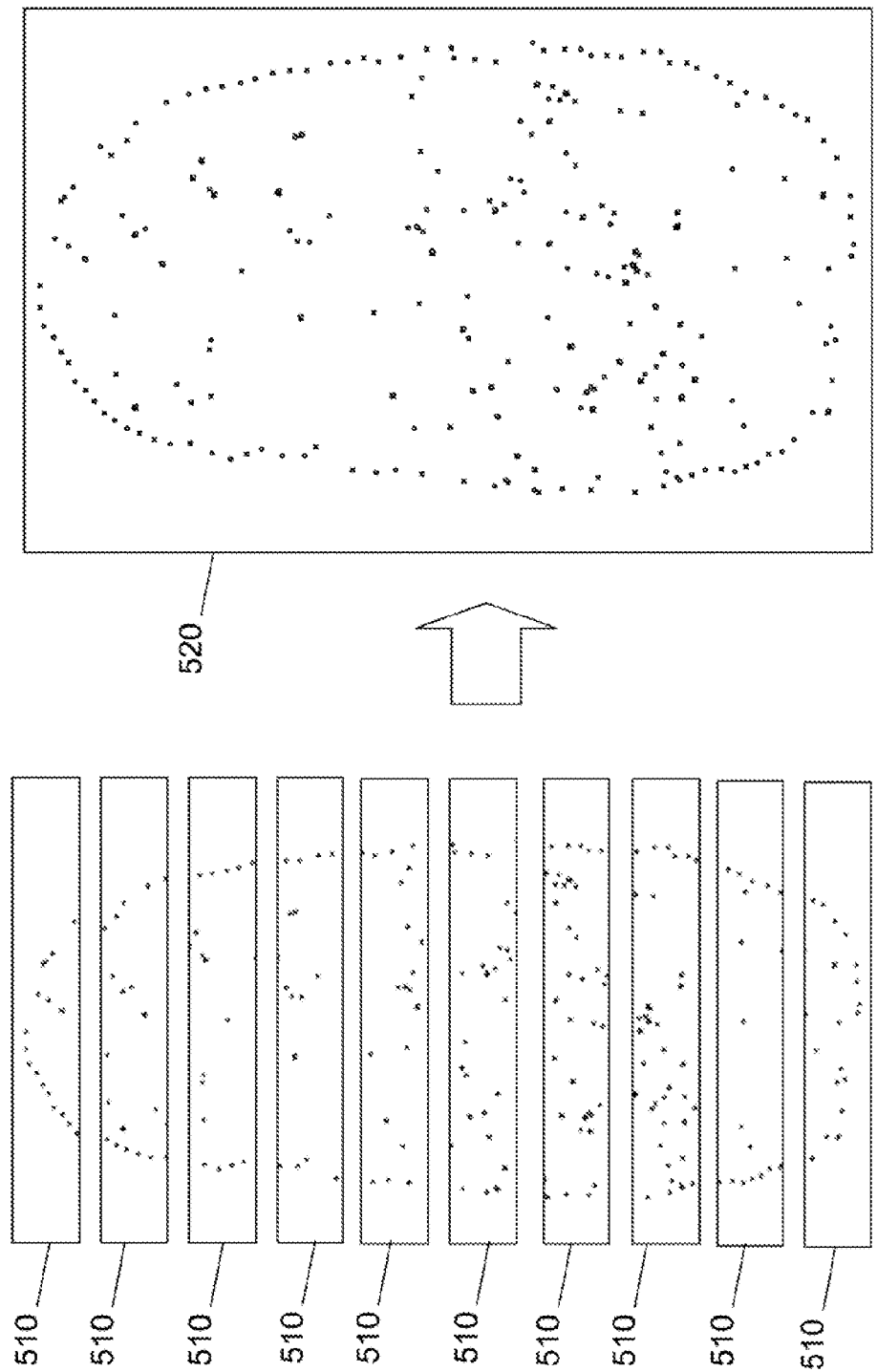
FIG. 5 is a schematic view of minutiae image stitching according to the present disclosure.

The processing unit 230 performs image stitching processing on all minutiae block images 510 in the storage unit 220. The processing unit 230 stitches the minutiae block images 510 in sequence into a minutiae image 520 corresponding to the complete fingerprint image 300. Referring to FIG. 5, FIG. 5 is a schematic view of minutiae image stitching according to the present disclosure. The processing unit 230 runs the fingerprint recognition program 224 according to the minutiae image 520. When the minutiae image 520 corresponds with a fingerprint of a user stored in the storage unit 220, the processing unit 230 returns response information of confirmation. If the minutiae image 520 does not correspond with the fingerprint of the user stored in the storage unit 220, the processing unit 230 returns response information of error. In addition to being played on a picture through a display unit, the response information may also make a speaker produce a corresponding alert sound.

In some embodiments, other kind of minutiae conversion program 222 may be used to generate minutiae block images. Descriptions of the binarization program or the minutiae point conversion program are provided below. It should be noted that the range setting of the image selection frame 310, the selection manner of the selection frame, and the combinations of various minutiae conversion programs 222 described below may be combined and vary according to changes of the recognition device.

Figure 6A:
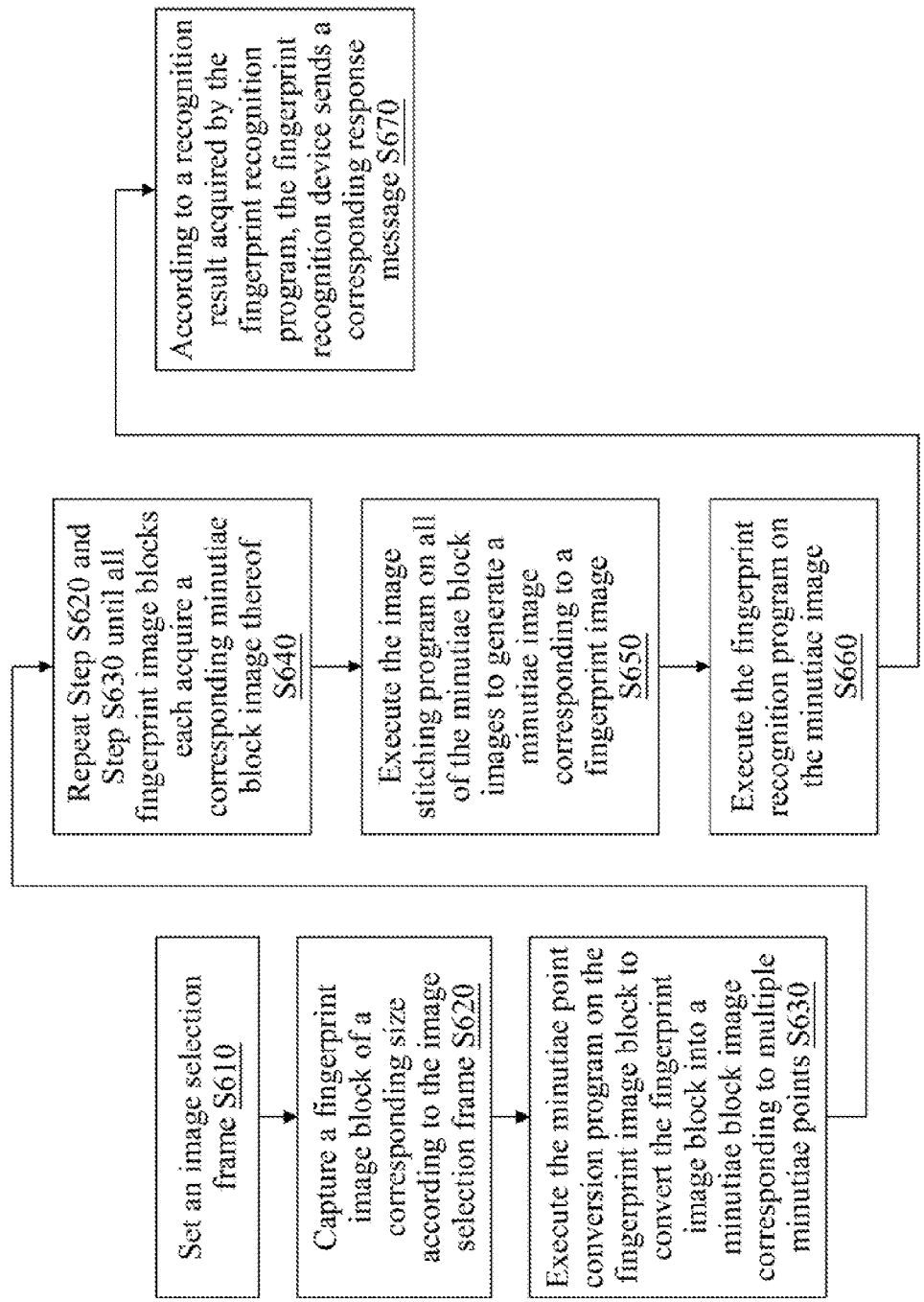
FIG. 6A is a schematic flow chart of an operation according to an embodiment of the present disclosure.

The description is given below with reference to the minutiae point conversion program, and FIG. 6A may be referred to.

In Step S610, image selection frames are set.

In Step S620, a fingerprint image block of a size corresponding to the image selection frame is captured.

In Step S630, the minutiae point conversion program is executed on the fingerprint image block to convert the fingerprint image block into a corresponding minutiae block image with multiple minutiae points.

In Step S640, Step S620 and Step S630 are repeated until a that the minutiae block images corresponding to all fingerprint image blocks are generated.

In Step S650, the image stitching program is executed on all of the minutiae block images to generate a minutiae image corresponding to a fingerprint image.

In Step S660, the fingerprint recognition program is executed on the minutiae image.

In Step S370, according to a recognition result acquired by the fingerprint recognition program, the fingerprint recognition device sends a corresponding response message.

Figure 6B:
FIG. 6B is a schematic view of capturing an image selection frame in a non-overlapping manner according to the present disclosure.

In order to illustrate the operation manner clearly, an example that the fingerprint image 300 is in a size of 100×40 pixels and the image selection frame 310 being in a size of 10×40 pixels is taken. Besides, in this example, the image selection frames 310 are captured in sequence in the non-overlapping manner. The processing unit 230 captures the fingerprint image blocks 221 one by one from top to bottom in the longitudinal axis direction. The image selection frame 310 performs selection in the non-overlapping manner, so that there are ten fingerprint image blocks 221 (100/10=10) which are captured one at a time, as shown in FIG. 6B.

Figure 6C:
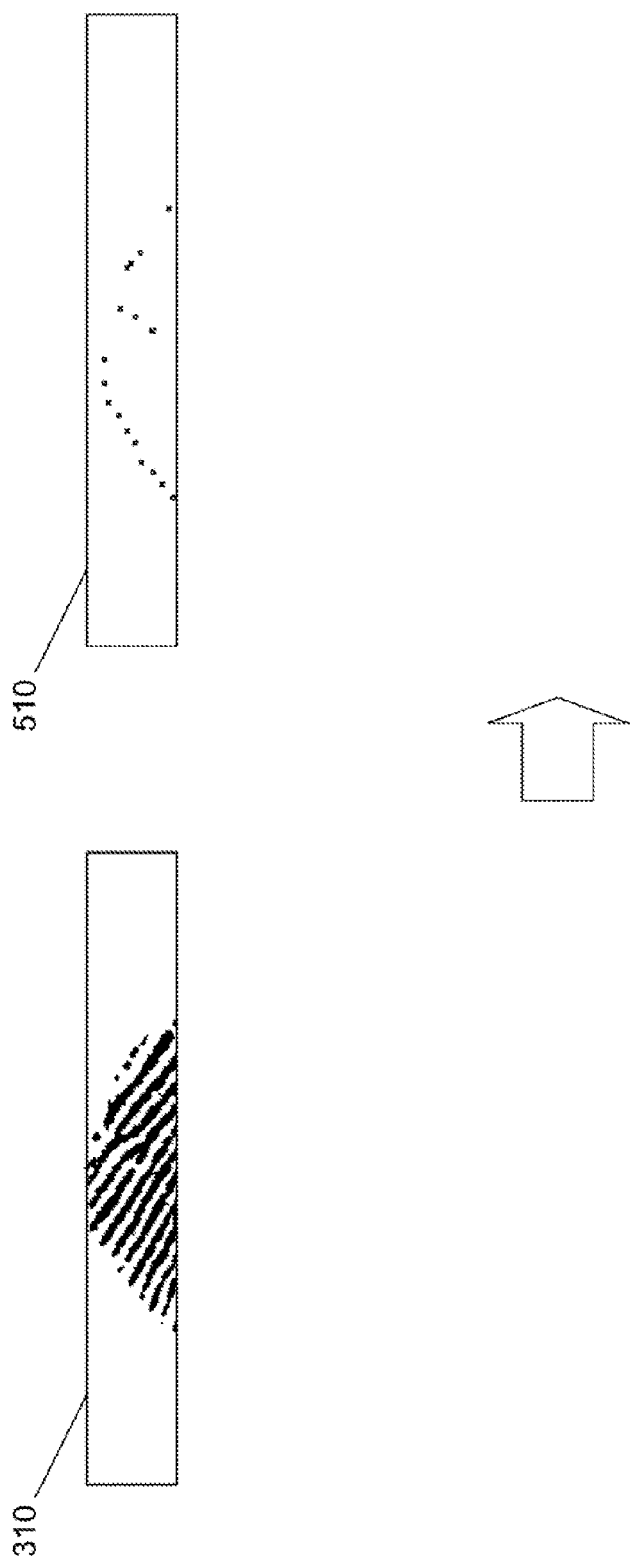
FIG. 6C is a minutiae block image having multiple minutiae points according to the present disclosure.

Then, the processing unit 230 runs the minutiae point conversion program on the fingerprint image blocks 221 to convert the fingerprint image blocks 221 into corresponding minutiae block images 510 with multiple minutiae points. Referring to FIG. 6C, FIG. 6C is a schematic view of a minutiae block image having multiple minutiae points. Fingerprint minutiae points mean fingerprint intersections and fingerprint breakpoints. Upon finding the fingerprint minutiae points, the processing unit 230 stores the minutiae points and vector relations between the minutiae points. The stored minutiae points and vector relations serve as a basis of fingerprint comparison, and the remaining fingerprint data is discarded at this time. Minutiae points of a fingerprint image are generally classified into: 1. type lines; and 2. core and delta, and the disclosure is not limited to using any particular type of minutiae point.

Figure 6D:
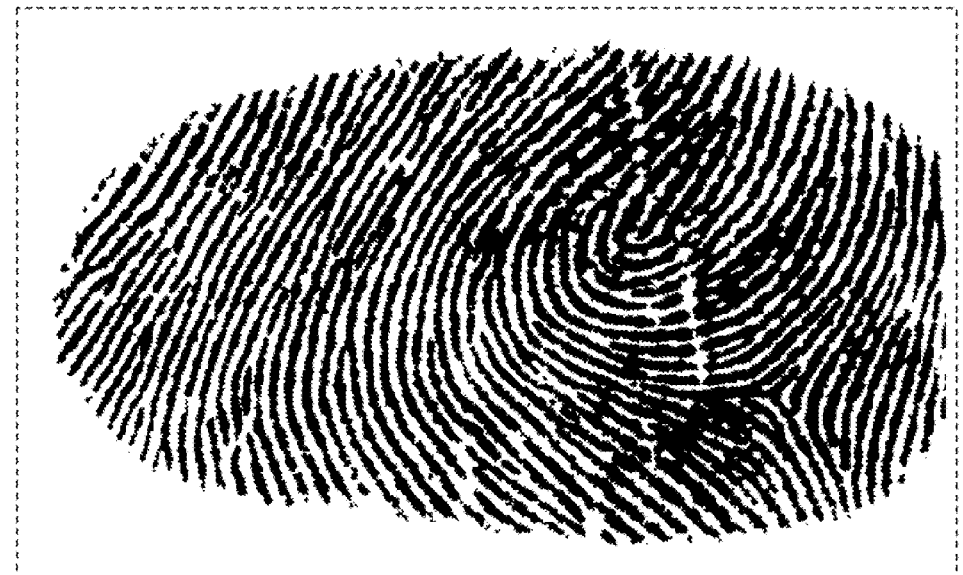
FIG. 6D is a schematic view of a minutiae image according to the present disclosure.
Figure 6D:
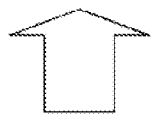
Figure 6D:
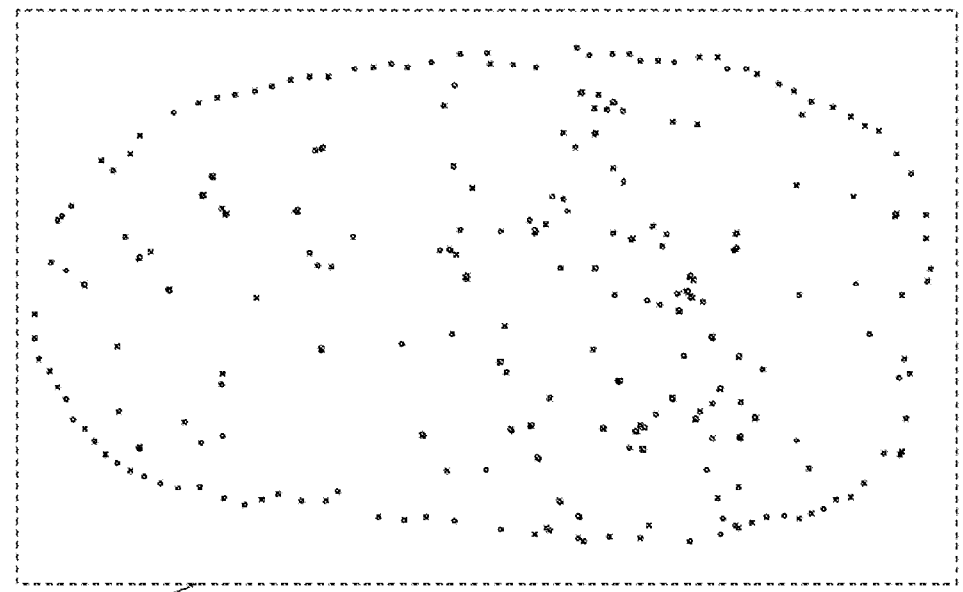

After the processing unit 230 generate all of the minutiae block images 510, the processing unit 230 stitches all of the minutiae block image 510, and outputs the minutiae image 520 as a stitch result. Referring to FIG. 6D, FIG. 6D is a schematic view of the minutiae image. Finally, the processing unit 230 executes the fingerprint recognition program 224 according to the minutiae image 520. According to a recognition result acquired by the fingerprint recognition program 224, the processing unit 230 makes the fingerprint recognition device 200 send a corresponding response message.

Figure 7A:
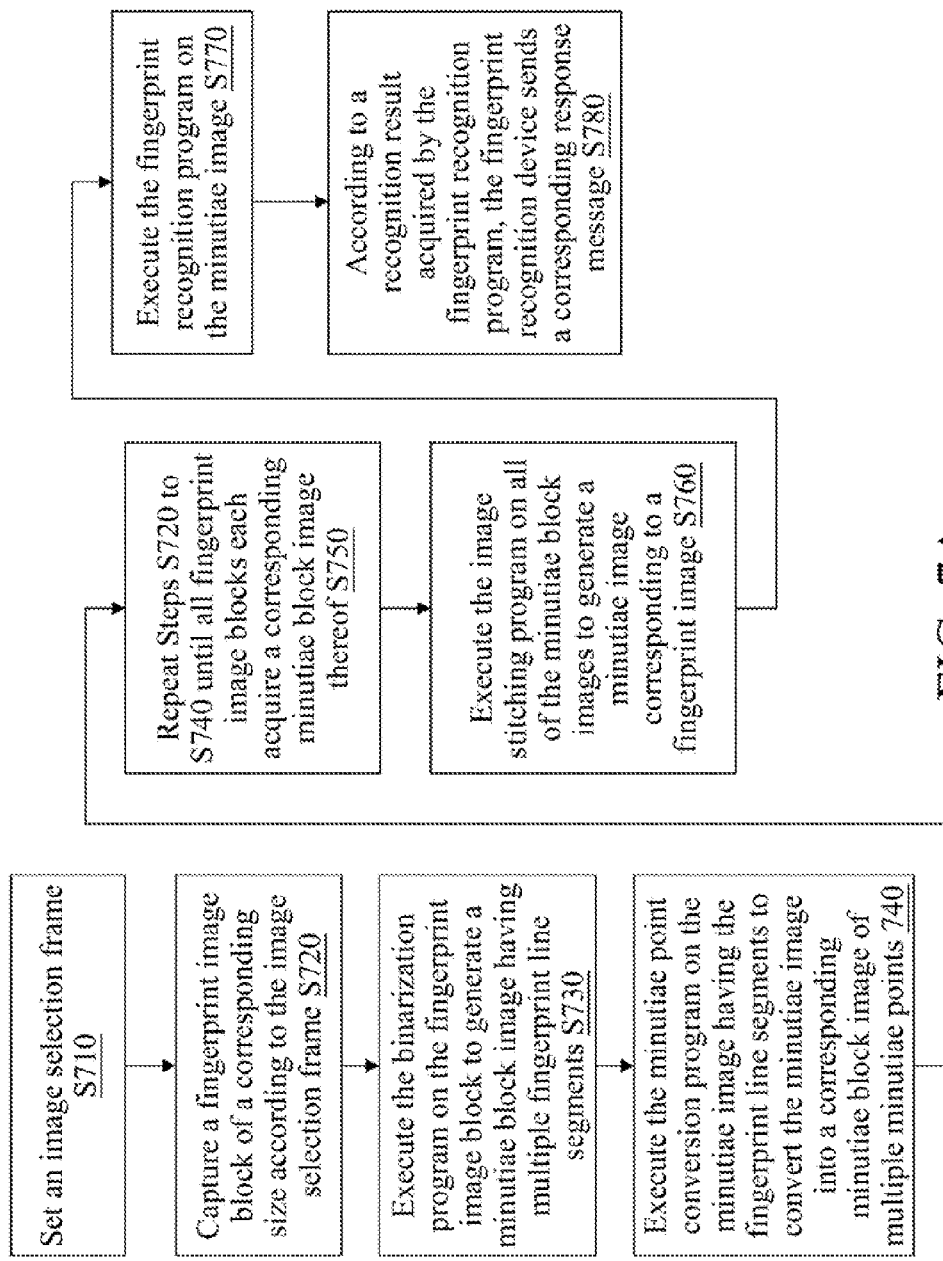
FIG. 7A is a schematic flow chart of an operation according to an embodiment of the present disclosure.

In addition to the minutiae conversion program, in the present disclosure the processing may be performed by combining the minutiae point conversion program and the binarization program. Referring to FIG. 7A, FIG. 7A is a schematic flow chart of an operation of another minutiae conversion program according to the present disclosure.

In Step S710, image selection frame are set.

In Step S720, a fingerprint image block of a size corresponding to the image selection frame is captured.

In Step S730, the binarization program is executed on the fingerprint image block to generate a minutiae image having multiple fingerprint line segments.

In Step S740, the minutiae point conversion program is executed on the minutiae image having the fingerprint line segments to convert the minutiae image into a corresponding minutiae block image with multiple minutiae points.

In Step S750, Steps S720 to S740 are repeated until that the minutiae block images corresponding to all fingerprint image blocks are generated.

In Step S760, the image stitching program is executed on all of the minutiae block images to generate a minutiae image corresponding to a fingerprint image.

In Step S770, the fingerprint recognition program is executed on the minutiae image.

In Step S780, according to a recognition result acquired by the fingerprint recognition program, the fingerprint recognition device sends a corresponding response message.

Figure 7B:
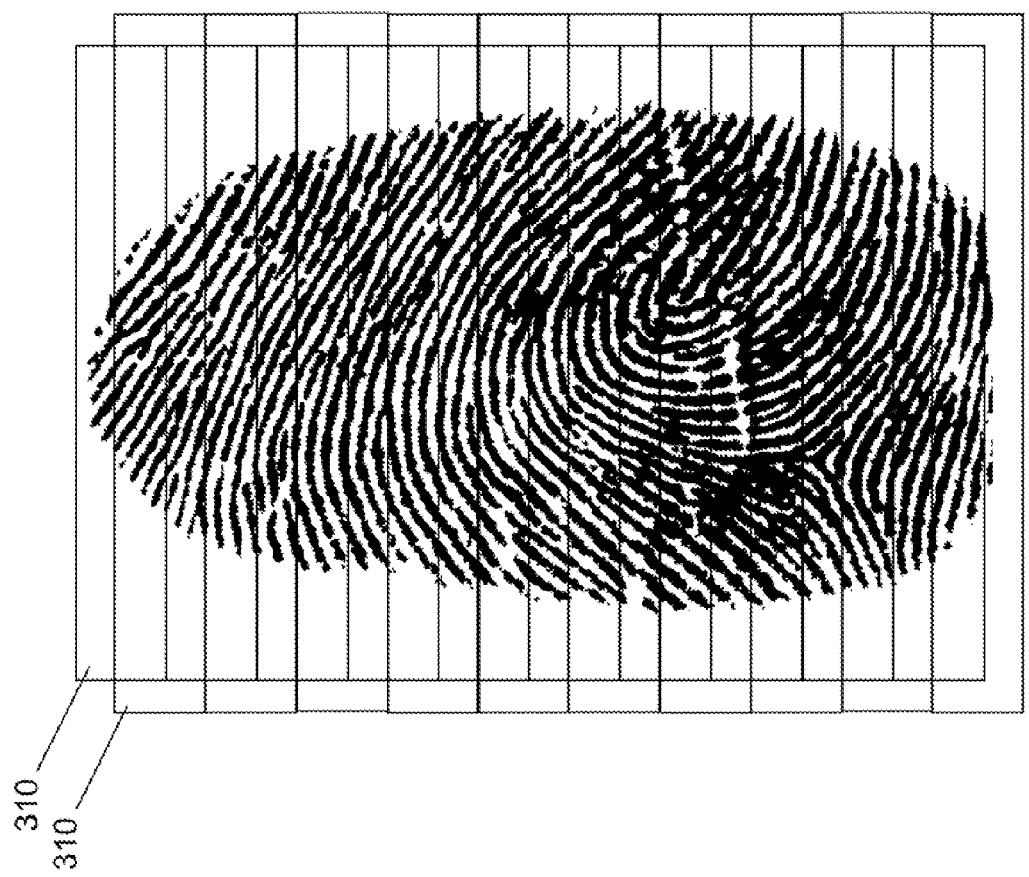
FIG. 7B is a schematic view of selecting an image selection frame in an overlapping manner according to the present disclosure.

In this embodiment, that the fingerprint image 300 is in a size of 100×40 pixels and the image selection frame 310 is in a size of 10×40 pixels is taken as an example. Besides, in this example, the image selection frames 310 are captured in sequence capturing, and any image selection frame 310 overlaps subsequent image selection frame 310 with 5 pixels. The image selection frame 310 performs selection in the overlapping manner so there are 20 fingerprint image blocks 221 (100/10*2=20) which are captured one at a time, as shown in FIG. 7B. In FIG. 7B, in order to highlight the overlapping manner, consecutive image selection frames 310 are shown in changing lengths, but in fact the image selection frames 310 are the same in size. Specifically, in FIG. 7B, the first image selection frame 310 is shown as a short selection frame, and the second image selection frame 310 is shown as a long selection frame, the third image selection frame 310 is shown as a short selection frame again, and the rest may be deduced by analogy.

If Space between two fingerprint line segments in the fingerprint image 300 is excessively short, minutiae point recognition may become difficult. Accordingly, in this embodiment, the binarization program is performed on the fingerprint image 300 fort thinning the line segment in the fingerprint image 300, so as to make the fingerprint image 300 clearer. Through processing of Step S720 and Step S730, a minutiae block image 511 having multiple fingerprint line segments is acquired, and is shown in FIG. 7C. A stitching area of two adjacent minutiae block images 511 is determined according to the directions of the fingerprint line segments of the minutiae block image 511.

Figure 7D:
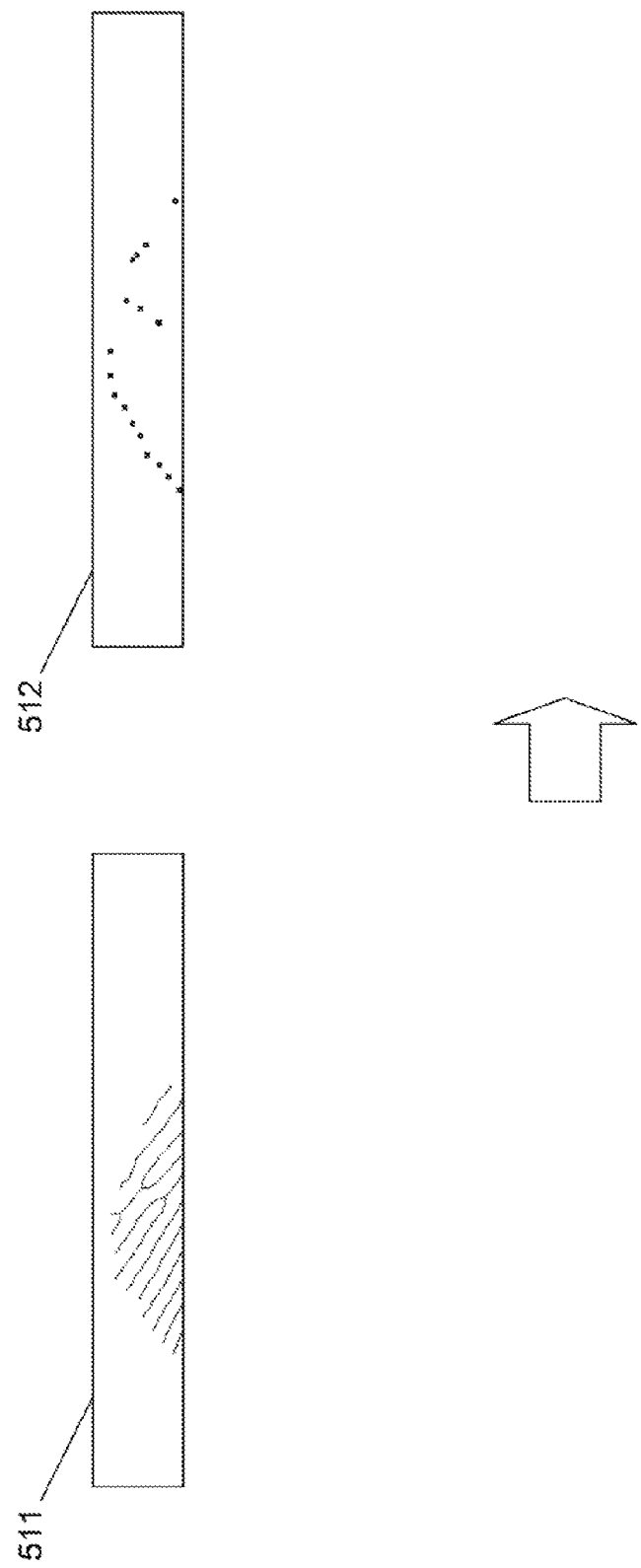
FIG. 7D is a schematic view of a minutiae block image of minutiae points according to the present disclosure.
Figure 7E:
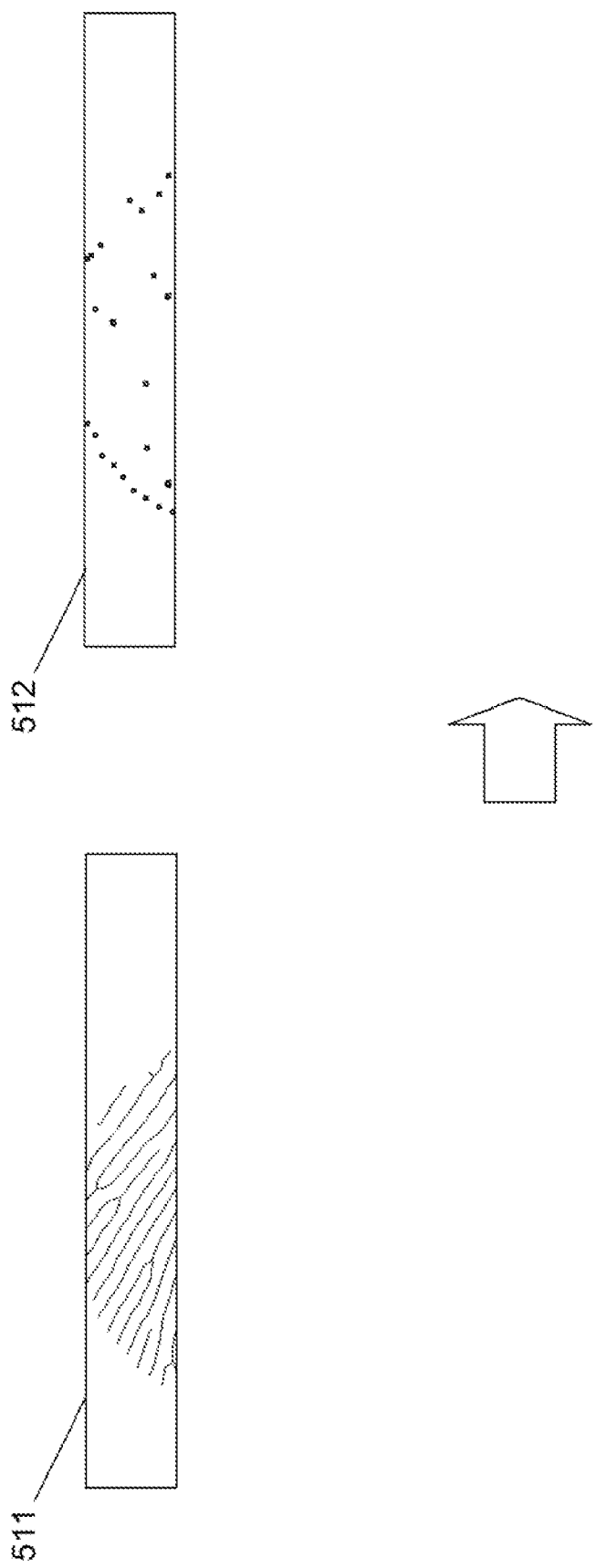
FIG. 7E is a schematic view of a next minutiae block image of minutiae points according to the present disclosure.

Then, the minutiae point conversion program is executed on the minutiae block image 510 on which binarization processing is already performed by the processing unit 230, so as to generate a corresponding minutiae block image 512 of multiple minutiae points, as shown in FIG. 7D. In this embodiment, the minutiae block image 510 is acquired in the overlapping manner, so that the second minutiae block image 510 (as shown in FIG. 7E) partly overlaps the previous minutiae block image 510.

Figure 7F:
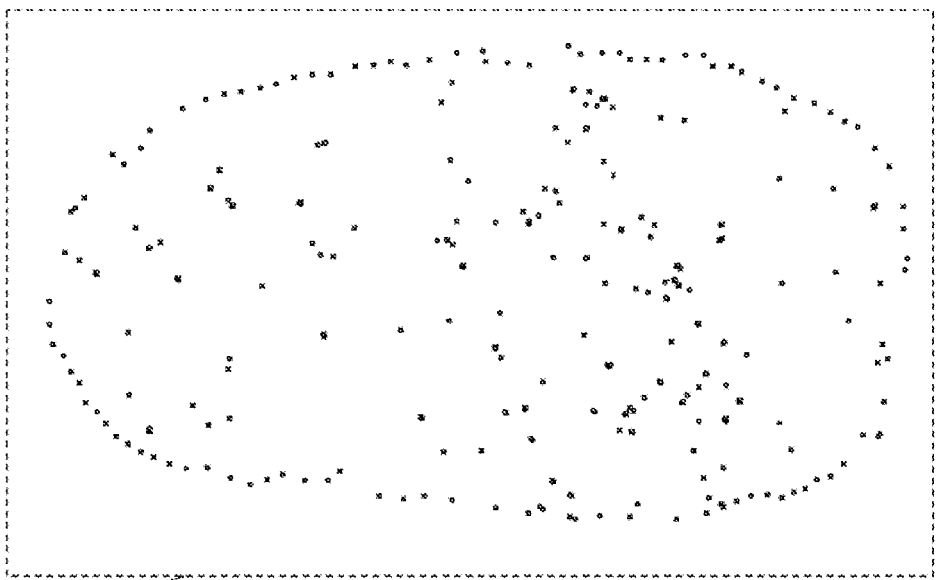
FIG. 7F is a schematic view of a minutiae image according to the present disclosure.
Figure 7F:
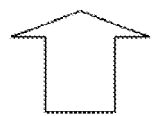
Figure 7F:
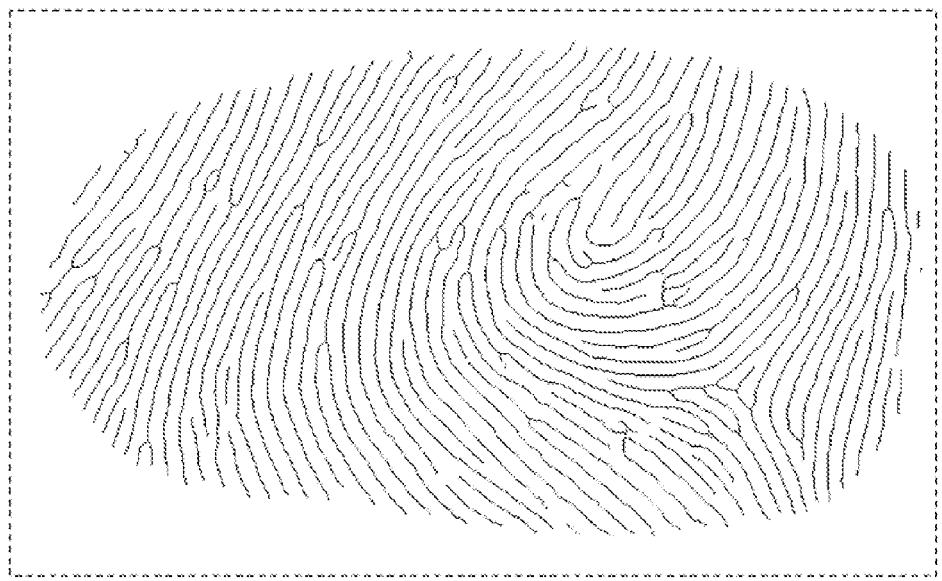

After the processing unit 230 executes the aforementioned steps repeatedly, the processing unit 230 obtains 20 minutiae block images 510. Each minutiae block images 510 partly overlaps the previous/next minutiae block image 512 thereof so the processing unit 230 may perform the image stitching processing by the alignment of minutiae points. Then, the processing unit 230 stitches all of the minutiae block images 512, executes the minutiae point conversion program on the stitched image, and then outputs a minutiae image 520, as shown in FIG. 7F.

Finally, the processing unit 230 executes the fingerprint recognition program 224 according to the minutiae image 520, and the processing unit 230 makes, according to a recognition result acquired by the fingerprint recognition program 224, the fingerprint recognition device 200 send a corresponding response message.

Figure 8A:
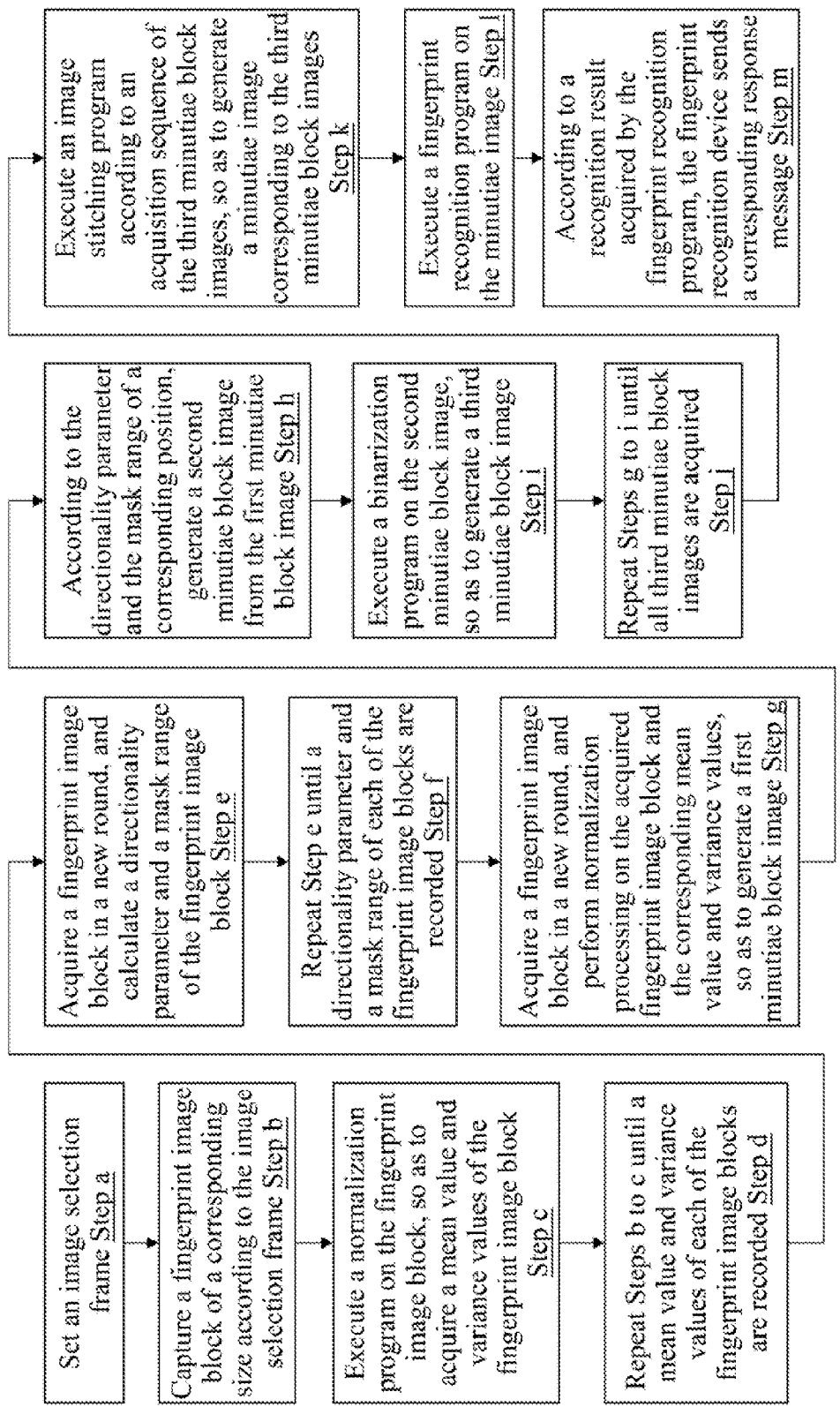
FIG. 8A is a schematic flow chart of another fingerprint image recognition method according to the present disclosure.
Figure 8B:
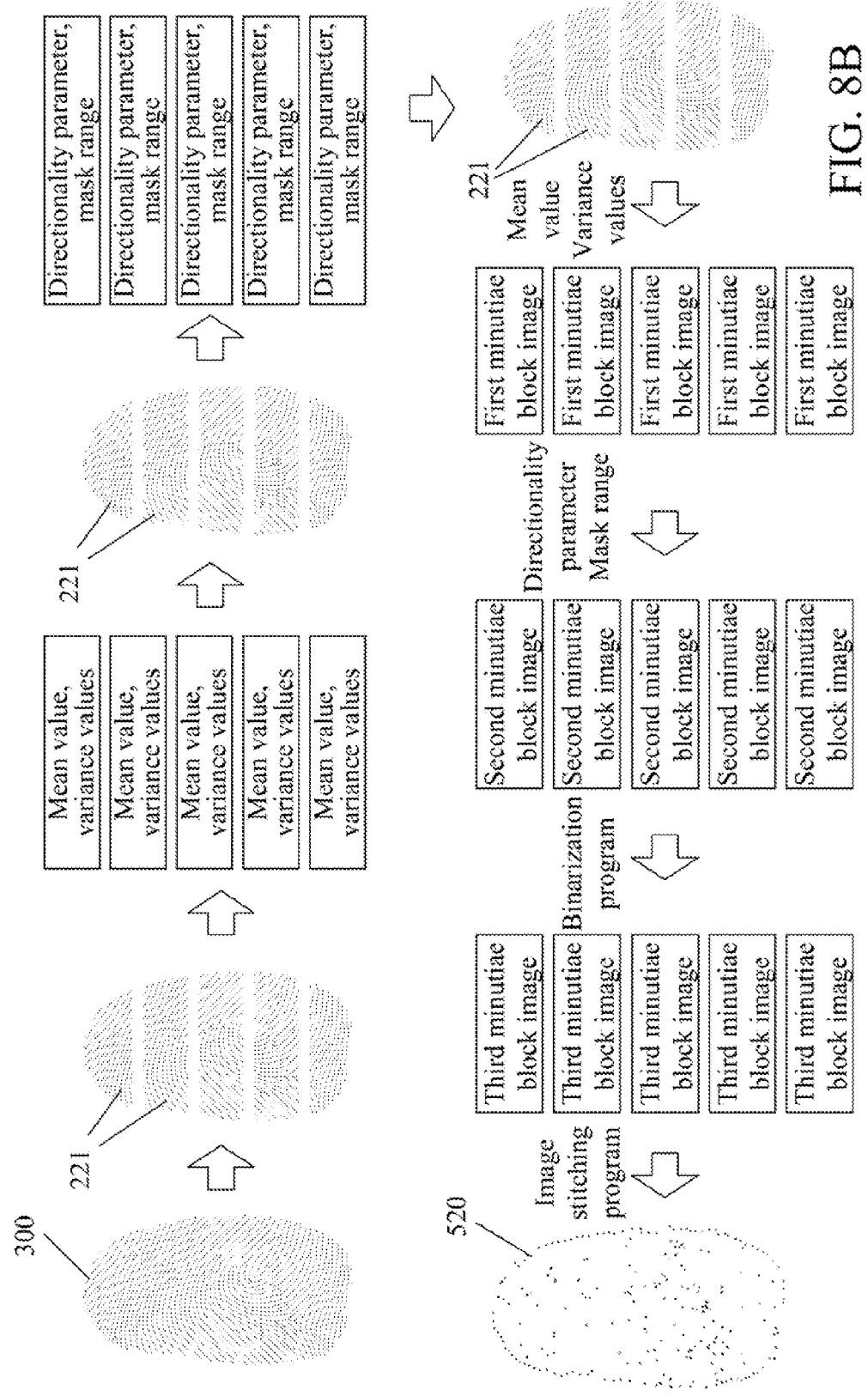
FIG. 8B is a schematic operation architecture view of the another fingerprint image recognition method according to the present disclosure.

In addition to the aforementioned manner in which the fingerprint image blocks 221 are processed, in some embodiments, the same fingerprint image block 221 may also be captured multiple times. Besides, each time the fingerprint image block 221 is captured some minutiae parameters are calculated. Referring to FIG. 8A and FIG. 8B, which respectively are a schematic flow chart and a schematic operation architecture view of another fingerprint image recognition method according to the present disclosure.

In Step a, image selection frames are set.

In Step b, a fingerprint image block of a corresponding size is captured according to the image selection frame.

In Step c, a normalization program is executed on the fingerprint image block, so as to acquire a mean value and variance values of the fingerprint image block.

In Step d, Steps b to c are repeated until a mean value and variance values of each of all fingerprint image blocks are recorded.

In Step e, the fingerprint image block is acquired again, and a directional parameter and a mask range of the fingerprint image block are calculated.

In Step f, Step e is repeated until a directional parameter and a mask range of each of all the fingerprint, image blocks are recorded.

In Step g, the fingerprint image block is acquired again, and normalization process is performed on the acquired fingerprint image block, the corresponding mean value and the variance value, so as to generate a first minutiae block image.

In Step h, according to the directional parameter and the mask range of a corresponding position, a second minutiae block image is generated from the first minutiae block image.

In Step i, the binarization program is executed on the second minutiae block image, so as to generate a third minutiae block image.

In Step j, Steps g to i are repeated until all third minutiae block images are acquired.

In Step k, an image stitching program is executed according to the acquisition sequence of the third minutiae block images, so as to generate a minutiae image corresponding to the third minutiae block images.

In Step l, the fingerprint recognition program is executed on the minutiae image.

In Step m, according to a recognition result acquired by the fingerprint recognition program, the fingerprint recognition device sends a corresponding response message.

The setting and the operation of the fingerprint image block selection frame 310 of the size corresponding to the image capture are the same as the above description, and, therefore, they are not again herein. In this operation manner, the same fingerprint image block 221 is captured during different periods, and in order to distinguish the fingerprint image blocks 221 captured at the different times, a processing time in which different fingerprint image blocks 200 of the same fingerprint image are captured is defined as an operation round. In other words, during each round all of the fingerprint image blocks 200 of fingerprint images 300 are captured.

First, in the first operation round, the normalization program is executed on the captured fingerprint image block 221, so as to calculate the mean value and the variance values of the fingerprint image block 221. Then, the capturing of the different fingerprint image blocks 221 is repeated, and the mean value and the variance values of each of the fingerprint image blocks 221 are calculated. The mean values and the variance values of all of the fingerprint image blocks 221 are recorded in the storage unit.

After the first operation round is completed, the fingerprint image blocks 221 are captured in a new round. Different from what is calculated in the first operation round, the directional parameter and the mask range of the fingerprint image block 221 are calculated after the fingerprint image block 221 is acquired in the second operation round. The directional parameter is used to record the direction of the fingerprint line segments in the recognized fingerprint image block 221, so as to determine the stitching area of two consecutive fingerprint image blocks 221. The mask range is used to determine a recognition range of the currently acquired fingerprint image block 221. In other words, in addition to the process performed on the entire acquired fingerprint image block 221, other process may also be performed on a part of the fingerprint image block 221.

The capturing processing of the fingerprint image block 221 is performed repeatedly, until the directional parameters and the mask ranges of all of the fingerprint image blocks 221 are acquired. The directional parameters and the mask ranges of all of the fingerprint image blocks 221 are recorded in the storage unit 220. Once the process on all of the fingerprint image blocks 221 is completed, the second operation round is completed.

In the third operation round, the fingerprint image blocks 221 are captured in sequence again. Different from what is calculated in the aforementioned operation rounds, the fingerprint image block 221 captured in the third operation round is processed with the mean value and the variance values of the corresponding position, and the first minutiae block image of the fingerprint image block 221 of the position is generated. Then, according to the directional parameter and the mask range of the corresponding position, the second minutiae block image is generated from the first minutiae block image. Finally, the binarization program is executed on the second minutiae block image, so as to generate the third minutiae block image. The aforementioned steps are repeated until all of the fingerprint image blocks 221 are recorded, thereby completing the third operation round.

The image stitching program is executed on the third minutiae block images acquired in the third operation round according to the acquisition sequence, so as to generate the minutiae image corresponding to the third minutiae block images. In this operation process, the minutiae image may be processed as follows. The binarization program is executed on the minutiae image to generate the minutiae image 520 having multiple fingerprint line segments.

Finally, the fingerprint recognition program is executed on the minutiae image. According to the recognition result acquired by the fingerprint recognition program, the processing unit 230 makes the fingerprint recognition device send the corresponding response message.

In the sectional fingerprint image recognition method and the device thereof provided by the present disclosure, the image selection frames 310 are preset, and the fingerprint image blocks 221 in different positions are captured in sequence. The recognition device acquires the corresponding minutiae block image 510 from the fingerprint image block 221. Finally, the recognition device stitches all of the minutiae block images 510, so as to generate the complete minutiae image 520. In this way, there is no need to install a storage unit 220 of large storage capacity in the fingerprint recognition device 200.

Figure 9:
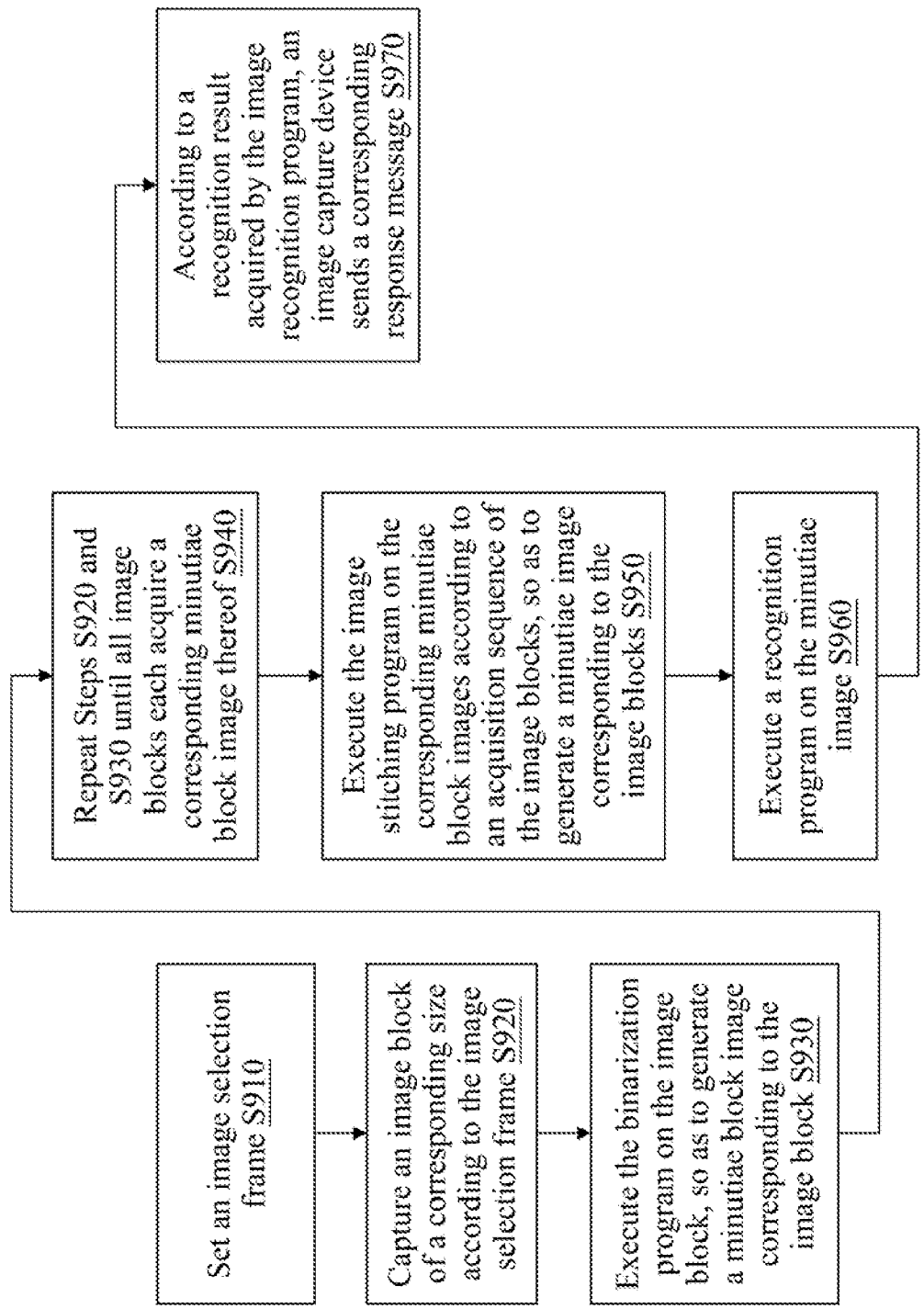
FIG. 9 is a schematic flow chart of recognition occurring when the present disclosure is applied to other images.

In addition to being applied in the recognition of the fingerprint image, the present disclosure may also be applied in minutiae recognition of various images, for example, a word image or a human face image. Referring to FIG. 9, the following steps are comprised.

In Step S910, image selection frame are set.

In Step S920, an image block of a corresponding size is captured according to the image selection frame.

In Step S930, the binarization program is executed on the image block, so as to generate a minutiae block image corresponding to the image block.

In Step S940, Steps S910 and S930 are repeated until all image blocks each acquire a corresponding minutiae block image thereof.

In Step S950, the image stitching program is executed on the corresponding minutiae block images according to an acquisition sequence of the image blocks, so as to generate a minutiae image corresponding to the fingerprint images.

In Step S960, an image recognition program is executed on the minutiae image.

In Step S970, according to a recognition result acquired by the image recognition program, an image capture device sends a corresponding response message.

The setting of the image selection frame and the capturing of the image blocks are the same as above. For a different image (a word image or a human face image), the binarization program may be used to perform conversion, so as to further reduce lines (or points or blocks) in the image block, thereby generating a skeleton image. Then, the generated minutiae block images are merged to generate the minutiae image. According to the present disclosure, a skeletonized or binarized image of a corresponding image may be generated according to various images, and the skeleton image (or the binarized image) is compared with a word database to perform other comparison.

For example, through the present disclosure, a personal computer (PC) may also achieve fingerprint recognition without the need of entering an operating system, and in combination of a Basic Input/Output System (BIOS) during computer startup, a user successfully passing the detection can perform a startup operation. In this way, data confidentiality is achieved. Furthermore, the user is not required to slide a finger thereof, so that the problem of image dislocation caused by an uneven force applied during pressing is not incurred.

What is claimed is:

1. A sectional image recognition method applied in a zonal fingerprint recognition device having a memory with small storage capacity, comprising:
   Step a: setting an image selection frame configured to capture a portion of a fingerprint image;
   Step b: capturing a fingerprint image block of the fingerprint image of a size corresponding to the image selection frame;

Step c: executing a minutiae conversion program on the fingerprint image block to generate a minutiae block image corresponding to the fingerprint image block;

Step d: repeating Step b and Step c until all fingerprint image blocks corresponding to the minutiae block images are obtained;

Step e: executing an image stitching program on the corresponding minutiae block images according to an acquisition sequence in which the fingerprint image blocks are obtained, so as to generate an overall minutiae image corresponding to the stitched minutiae block images;

Step f: executing a fingerprint recognition program on the overall minutiae image; and Step g: according to a recognition result acquired by the fingerprint recognition program, sending, by the zonal fingerprint recognition device, a corresponding response message.

2. The sectional image recognition method according to claim 1, wherein the step of executing the minutiae conversion program further comprises: executing a binarization program on the fingerprint image block to generate the minutiae block image having multiple fingerprint line segments.

3. The sectional image recognition method according to claim 2, wherein the image stitching program is used for connecting two consecutive minutiae block images according to direction of the fingerprint line segments in the minutiae block image until that all of the minutiae block images are stitched, and, therefore, the minutiae image is generated.

4. The sectional image recognition method according to claim 3, further comprising a step of, before the step of generating the minutiae image, executing a minutiae point conversion program on the minutiae image having the fingerprint line segments for converting the minutiae image into a corresponding minutiae image having multiple minutiae points.

5. The sectional image recognition method according to claim 2, the acquiring the fingerprint image blocks in Step d further comprises: according to a position of a previous fingerprint image block, acquiring a new fingerprint image block not overlapping the previous fingerprint image block.

6. The sectional image recognition method according to claim 2, the acquiring the fingerprint image blocks in Step d further comprises: according to a position of a previous fingerprint image block, acquiring a new fingerprint image block partly overlapping the previous fingerprint image block.

7. The sectional image recognition method according to claim 1, wherein the executing the minutiae conversion program further comprises: executing a minutiae point conversion program on the fingerprint image block to convert the fingerprint image block into the corresponding minutiae block image having multiple minutiae points.

8. The sectional image recognition method according to claim 7, the acquiring the fingerprint image blocks in Step c further comprises: according to a position of a previous fingerprint image block, acquiring a new fingerprint image block not overlapping the previous fingerprint image block.

9. The sectional image recognition method according to claim 8, the acquiring the fingerprint image blocks in Step c further comprises: according to a position of a previous fingerprint image block, acquiring a new fingerprint image block partly overlapping the previous fingerprint image block.

10. A zonal image recognition device applying claim 1, comprising:

an image capture unit, used to capture the fingerprint image blocks;

a storage unit, used to store the fingerprint image blocks, the minutiae conversion program, the image stitching program, and the fingerprint recognition program; and a processing unit, electrically connected to the image capture unit and the storage unit, wherein the processing unit acquires the fingerprint image blocks in sequence according to the image selection frame and through the image capture unit, the processing unit executes the minutiae conversion program on the fingerprint image block to generate the minutiae block image corresponding to the fingerprint image block, the processing unit acquires the minutiae image from the minutiae block images through the image stitching program, and the processing unit executes the: fingerprint recognition program according to the minutiae image and returns the corresponding response message.

11. The zonal recognition device according to claim 10, wherein the minutiae conversion program is a binarization program or a minutiae point conversion program.

12. The zonal recognition device according to claim 11, wherein the binarization program is executed on the fingerprint image block to generate the minutiae block image having multiple fingerprint line segments, and the image stitching program is used to connect two consecutive minutiae block images according to direction of the fingerprint line segments until that all of the minutiae block images is connected and, therefore, the minutiae image is generated.

13. The zonal recognition device according to claim 12, wherein before the step of generating the minutiae image, the minutiae point conversion program is executed on the minutiae image having the fingerprint line segments, so as to convert the minutiae image into the corresponding minutiae image having multiple minutiae points.

14. A sectional image recognition method applied in an image capture device having a memory with small storage capacity and used to process multiple received input images, comprising:

Step a: setting an image selection frame;

Step b: capturing an image block of a size corresponding to the image selection frame;

Step c: executing a binarization program on the image block for generating a minutiae block image corresponding to the image block;

Step d: repeating Step b and Step c until minutiae block image corresponding to all image blocks are obtained;

Step e: executing an image stitching program on the corresponding minutiae block image according to an acquisition sequence of the image blocks, the acquisition sequence based on the fingerprint image blocks being captured in a predetermined manner, for generating a minutiae image corresponding to the input images;

Step f: executing an image recognition program on the minutiae image; and

Step g: according to a recognition result acquired by the image recognition program, sending, by the image capture device, a corresponding response message.

15. The sectional image recognition method according to claim 14, wherein each of the input images is a word image, a fingerprint image, or a human face image.

16. The sectional image recognition method according to claim 14, wherein the binarization program is executed on the image block to generate the minutiae block image having multiple line segments or multiple minutiae points.

* * * * *